United States Patent [19]

Ogawa et al.

[11] Patent Number: 5,177,375
[45] Date of Patent: Jan. 5, 1993

[54] POWER ON RESET CIRCUIT FOR SEMICONDUCTOR INTEGRATED CIRCUIT DEVICE

[75] Inventors: Toshiyuki Ogawa; Shinji Kawai, both of Hyogo, Japan

[73] Assignee: Mitsubishi Denki Kabushiki Kaisha, Tokyo, Japan

[21] Appl. No.: 628,696

[22] Filed: Dec. 14, 1990

[30] Foreign Application Priority Data

Dec. 28, 1989 [JP] Japan .................. 1-340203

[51] Int. Cl.[5] ................... H03K 3/284; H03K 5/13
[52] U.S. Cl. ..................... 307/272.3; 307/296.5; 307/594; 307/362
[58] Field of Search .............. 307/272.3, 362, 303

[56] References Cited

U.S. PATENT DOCUMENTS

| | | | |
|---|---|---|---|
| 4,140,930 | 2/1979 | Tanaka | 307/594 |
| 4,716,302 | 12/1987 | Flannagan et al. | 307/594 |
| 4,788,454 | 11/1988 | Tanagawa et al. | 307/362 |
| 4,886,984 | 12/1989 | Nakaoka | 307/269 |
| 4,933,902 | 6/1990 | Yamada et al. | 307/272.3 |

FOREIGN PATENT DOCUMENTS

| | | |
|---|---|---|
| 0150480A2 | 8/1985 | European Pat. Off. . |
| 0303257 | 2/1989 | European Pat. Off. ......... 307/272.3 |
| 3515611C2 | 10/1986 | Fed. Rep. of Germany . |

Primary Examiner—Timothy P. Callahan
Attorney, Agent, or Firm—Lowe, Price, LeBlanc & Becker

[57] ABSTRACT

A semiconductor integrated circuit device comprising an internal reset circuit generating one shot pulse for resetting an internal circuit upon a power on. In the internal reset circuit, inputted to a two-input NOR gate are an output potential of an inverter inverting a first node coupled to a power supply through a capacitor, and an internal clock signal which level inverts at a predetermined timing after rising to a "H" level upon the power on. Then, the output of the NOR gate is applied to a second node in an internal circuit to be reset. The internal reset circuit outputs one shot pulses synchronizing with the first fall of the internal clock signal after the power on irrespective of a potential change rate of the first node after the power on. The first node is set to more easily attain a "H" level than the second node to be reset to a "L" level at the power on by adjusting characteristics of circuit elements connected to the first node and those of circuit elements connected to the second node. As a result, the second node is set to be without fail at a "L" level requiring no resetting when the inverted potential of the first node has a value allowing a generation of one shot pulses at the NOR gate, thereby preventing malfunction of the internal circuit due to erroneous resetting.

14 Claims, 8 Drawing Sheets

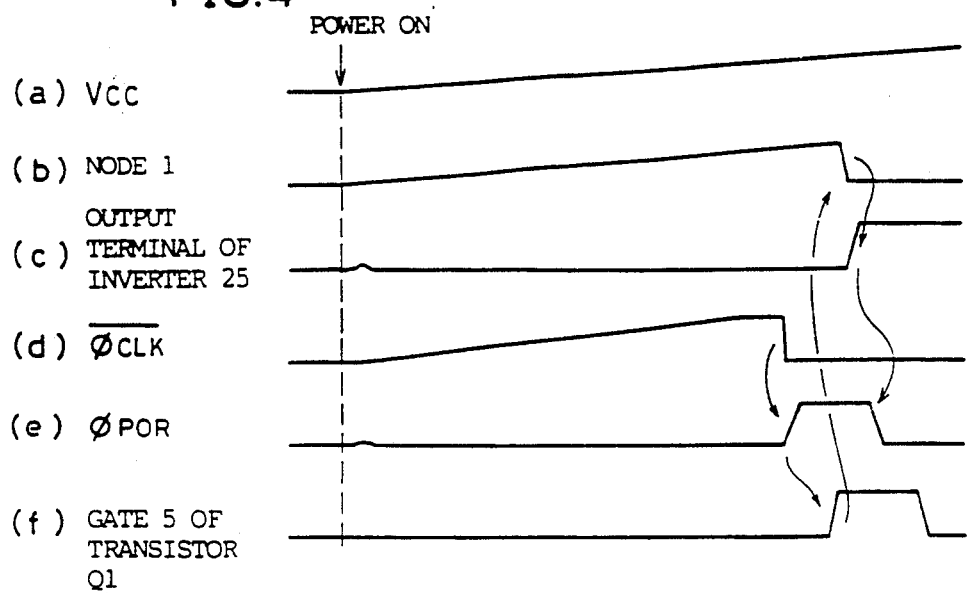
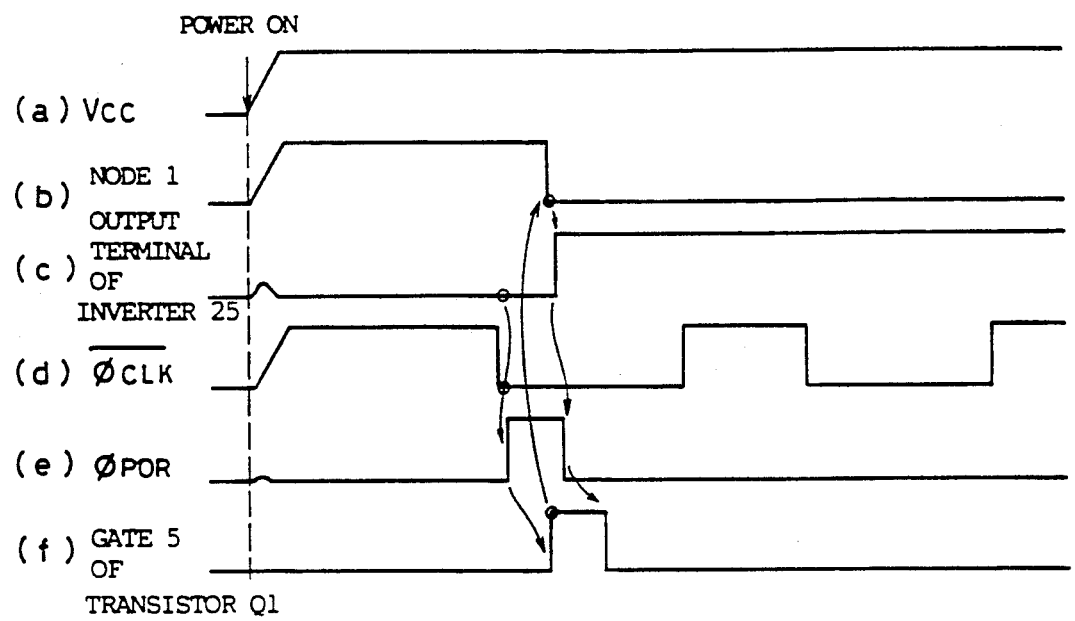

FIG.10  PRIOR ART
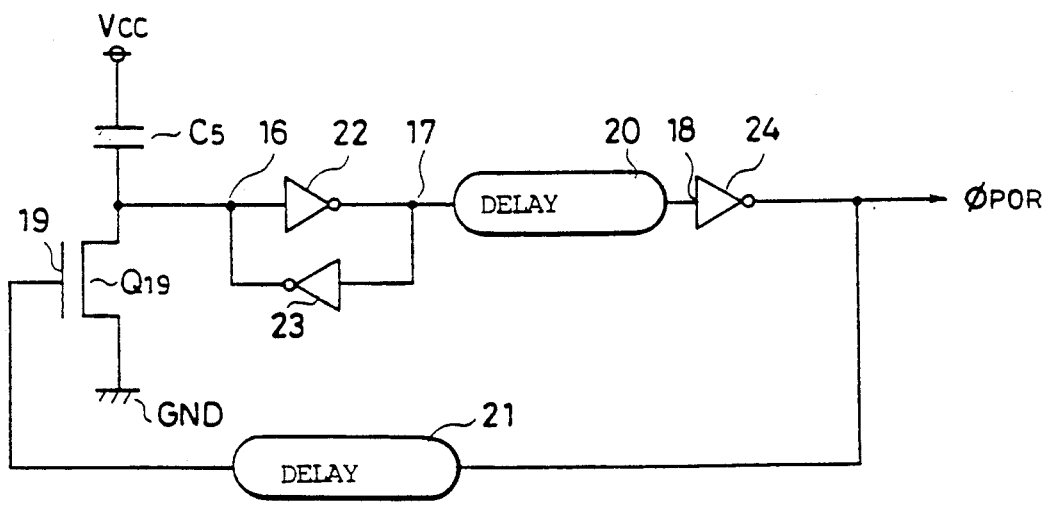
FIG.11  PRIOR ART
(a) Vcc
(b) NODE 16
(c) NODE 17
(d) INPUT TERMINAL 18 OF INVERTER 24
(e) ØPOR
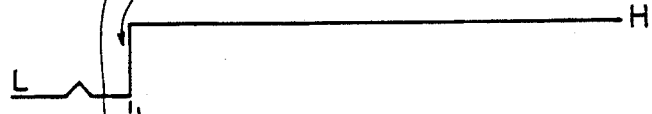
(f) GATE 19 OF TRANSISTOR Q19
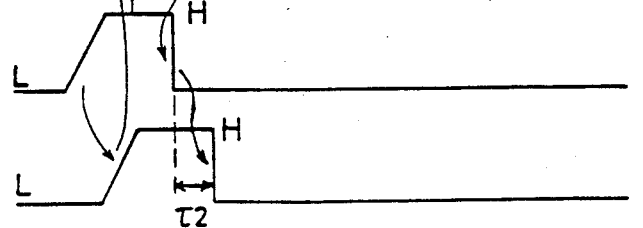

POWER ON RESET CIRCUIT FOR SEMICONDUCTOR INTEGRATED CIRCUIT DEVICE

BACKGROUND OF THE INVENTION

1. Field of the Invention

The present invention relates generally to semiconductor integrated circuit devices, and more particularly, to semiconductor integrated circuit devices comprising internal reset circuits for resetting predetermined internal circuits when a power supply is turned on.

2. Description of the Background Art

A semiconductor memory device such as a DRAM (Dynamic Random Access Memory) or an EPROM (Erasable and Programmable Read Only Memory), includes an internal circuit which should be reset at a start of an operation. Such resetting comprises initialization of an internal register or initialization of controlling redundancy circuit. For this purpose, the circuit provided in the device is an internal reset circuit. The internal reset circuit generates a one shot pulse when an external power supply which drives the semiconductor memory device is turned on and applies the same to a predetermined internal circuit, thereby carrying out "initialization" for the predetermined internal circuit.

FIG. 9 is a schematic block diagram of a dual port memory, one of the semiconductor integrated circuit devices having internal reset circuits. The dual port memory comprises a random accessible memory cell array having memory cells arranged in matrix and a serially accessible data register, which memory is for use as a frame memory of a video recorder, for example.

In FIG. 9, a memory cell array 101 comprises 4 sub-memory cell arrays each including a plurality ($=512 \times 512$) of memory cells arranged in 512 rows and in 512 columns. An address buffer 102 externally receives address signals A0–A8. A row decoder 103 receives the address signals from address buffer 102 to select one row of memory cell array 101. A column decoder 104 receives the address signals from address buffer 102 to select one column of memory cell array 101. The data in the memory cells selected by row decoder 103 and column decoder 104 is outputted to a data input/output terminal r through a sense amplifier·I/O control circuit 105 and an I/O buffer 106. The four-bit data $WIO_0$–$WIO_3$ applied to data input/output terminal r is inputted to the memory cells selected by row decoder 103 and column decoder 104 through I/O buffer 106 and sense amplifier·I/O control circuit 105, in each of 4 sub-memory cell arrays.

Meanwhile, a data register 107 comprises a plurality of registers arranged in one row. Data register 107 and memory cell array 101 transfer data to be written in or read from memory cells arranged in one row in the memory cell array 101 therebetween. An address pointer 108 sets the address signals applied from address buffer 102 for the address data to be applied to a serial data selector 109. The serial data selector 109 receives the address data set by the address pointer 108 to select 512 registers in data register 107. Serial data selector 109 includes a shift register sequentially selecting 512 registers in data register 107 or a decoder selecting 512 registers in data register 107 in response to the address signals. A serial I/O buffer 110 transfers serial input/output data $SIO_0$–$SIO_3$ between serial data selector 109 and a data input/output terminals. A timing generator 111 externally receives a row address strobe signal $\overline{RAS}$, a column address strobe signal $\overline{CAS}$, a write per bit/write enable signal $\overline{WV}/\overline{WE}$, a data transfer/output enable signal $\overline{DT}/\overline{OE}$, a serial control signal SC and a serial enable signal $\overline{SE}$ to generate various timing signals for controlling an operation of each part.

A color register 113 temporarily stored the data applied to data input/output terminal r through I/O buffer 106 and applies the temporarily stored data to I/O buffer 106.

A write mask register 114 temporarily stores a mask bit instructing signal included in the data applied to data input/output terminal r through I/O buffer 106 and also applies the temporarily stored mask bit instructing signal to I/O buffer 106. The mask bit instructing signal instructs whether or not the data applied to data input/output terminal r is written in the memory cell.

At the start of the operation of the dual port memory, the above-described color register 113 and write mask register 114 should hold no data. Therefore, color register 113 and write mask register 114 need to be reset at the application of the external power supply (subsequently referred to as "power on"). Thus, the dual port memory includes a POR (Power-On-Reset Signal) generating circuit 112b which is an internal reset circuit.

POR generating circuit 112b outputs a one shot pulse POR to reset color register 113 and write mask register 114 at the power on.

FIG. 10 is a circuit diagram showing a common arrangement of such an internal reset circuit as described above.

Referring to FIG. 10, the internal reset circuit comprises series-connected capacitor C5 and N channel MOS transistor Q19 provided between a power supply Vcc and ground GND, a delay circuit 20, a latch circuit which is a reverse parallel circuit including inverters 22 and 23 provided between the node between capacitor C5 and transistor Q19 and delay circuit 20, and series-connected inverter 24 and delay circuit 21 provided between delay circuit 20 and the gate of the transistor Q19. An output $\phi_{POR}$ of the internal reset circuit is extracted from the output end of inverter 24.

The operation of the internal reset circuit will be described with reference to FIG. 11. FIG. 11 is a timing chart explaining the operation of the internal reset circuit.

When the power supply is turned on, the potential at the power supply Vcc rises as shown in FIG. 11(a). This potential rise is transmitted to the input end of inverter 22 through capacitor C5. As a result, a potential at a connection point (a node 16) between the input end of inverter 22 and 23 rises to a high level as shown in FIG. 11(b). Meanwhile, the potential at the output end of inverter 22 driven by the power supply Vcc starts rising upon the turning-on of the power supply as shown in FIG. 11(c). However, since the potential at the input end of inverter 22, that is, the potential at node 16 instantly attains a high level, the potential at the output end of inverter 22 instantly drops to a low level in response thereto. The potential level "L" (logical low) of the output end of inverter 22 is inverted by inverter 23 and applied to the input end of inverter 22. As a result, the potential level of node 16 is fixed to a "H", so that a logical "L" level is latched at a node 17 which is a connection point between the output end of inverter 22 and inverter 23.

The potential at node 17, after being delayed by delay circuit 20, is inputted to inverter 24. Therefore, the potential at node 17 appears at an input end 18 of inverter 24 with a the delay time τ1 in delay circuit 20, as shown in FIG; 11(d). Since inverter 24 inverts the output potential of delay circuit 20 to be outputted, the output potential of inverter 24, that is, the output $\phi_{POR}$ of the internal reset circuit rises to a high level upon the turning-on of the power supply as shown in FIG. 11 (e).

The output of inverter 24 is applied to the predetermined internal circuit and it is also delayed by delay circuit 21. The delayed output is applied to gate 19 of transistor Q19. The potential at gate 19 of transistor Q19 accordingly attains a high level later than the output potential of inverter 24 does with a delay time τ2 in delay circuit 21, as shown in FIG. 11 (f).

When the potential at gate 19 attains a high level, transistor Q19 conducts. As a result, the potential at node 16 drops from the high level to a low level in response to a low potential at ground GND. Namely, the potential at node 16, after once attaining a high level upon the turning-on of the power supply, is maintained at a high level for the period corresponding to the sum of the delay times τ1 and τ2 in delay circuits 20 and 21, respectively and then the potential attains a low level (see FIG. 11 (b)).

When the potential at node 16 attains the low level, the potential at node 17 rises from the low level to a high level by an inverting operation of inverter 22. This time, logical levels "L" and "H" are latched in nodes 16 and 17 by inverters 22 and 23, respectively. More specifically, the potential at node 17 attains a low level shortly after the slight rise upon the turning-on of the power supply and then it attains a high level in response to the potential at node 16 attaining a low level (see FIG. 11 (c)).

Meanwhile, the potential at node 17 is delayed by delay circuit 20 and then inverted by inverter 24, as described above. Therefore, the potential at input end 18 of inverter 24 rises later than the potential at node 17 does with the delay time τ1 after the turning-on of the power supply (see FIG. 11 (d)). The output $\phi_{POR}$ of inverter 24 rises to a high level upon the turning-on of the power supply and then after being maintained at a high level for a period corresponding to the delay time τ1 in delay circuit 20, the output drops to a low level (see FIG. 11 (e)).

The output potential of inverter 24 is fed back to gate 19 of transistor Q19 through delay circuit 21. As shown in FIG. 10 (f), the potential at gate 19 of transistor Q19 accordingly once attains a high level for a certain period upon the turning-on of the power supply, and then attains a low level. When the potential at gate 19 drops from a high level to the low level, the transistor Q19 being conductive until then again becomes non-conductive. However, the potential at node 16 is fixed to a low level hereinafter in response to the high level potential latched in node 17. As a result, after dropping from the high level to a low level upon the turning-off of the power supply, the potentials at node 16, gate 19 and the output end of inverter 24 are maintained at the low level. After rising from the low level to a high level upon the turning-on of the power supply. The potentials at node 17 and the input end 18 of inverter 24 are maintained at the high level.

As a result of such operations of the internal reset circuit as the foregoing, the signal attaining a high level for a certain period, that is, one shot pulse is inputted from inverter 24 upon a turning-on of the power supply. The one pulse is a power-on-reset signal POR for resetting the predetermined internal circuit.

As the foregoing, a conventional internal reset circuit provided in a semiconductor integrated circuit device is structured so as to output one shot pulse by utilizing a rise of a power supply voltage, thereby causing such problems as follows. These problems will be described with reference to FIGS. 12 and 13, taking the internal reset signal shown in FIG. 10 as an example. FIG. 12 is a circuit diagram showing in more detail the internal reset circuit shown in FIG. 10. FIG. 13 is a timing chart explaining the operations of the internal reset circuit of FIG. 10 when a power supply voltage is slow in rising after a power supply is turned on. Referring to FIG. 12, inverters 22, 23 and 24 comprise series-connected P channel MOS transistor Q26 and N channel MOS transistor Q27, series-connected P channel MOS transistor Q24 and N channel MOS transistor Q25 and series-connected P-channel MOS transistor Q28 and N channel MOS transistor Q29, respectively, each transistor being provided between a power supply Vcc and ground GND.

The previously described operations of the internal reset circuit shown in FIG. 10 correspond to a quick rise of the power supply voltage after the power supply is turned on. However, the rise rate of the power supply voltage after turning-on of the power supply varies depending on the capacitance of the semiconductor integrated circuit device to be driven by the applied power supply or the like.

For example, as shown in FIG. 13 (a), when the power supply voltage rises very slowly (for example taking more than 100 ms) after a turning-on of the power supply, the potential at node 16 receiving the power supply voltage through capacitor C5 in FIG. 12 also starts rising slowly as shown in FIG. 13 (b). Thus, the potential at node 16 does not rapidly rise to the level allowing transistor Q27 constituting inverter 22 to be rendered fully conductive. As a result, in inverter 22 after the turning-on of the power supply, transistor Q26 conducts for a long period. Therefore, the potential at the output end of inverter 22, that is, the potential at node 17 starts rising slowly in response to the potential at the power supply Vcc as shown in FIG. 13 (c). The potential at input end 18 of inverter 24 also slowly rises accordingly as shown in FIG. 13 (d). Namely, the potential at the input end 18 is maintained at a low potential allowing transistor Q28 constituting inverter 24 to conduct for a long period after the turning-on of the power supply. As a result, the output potential at inverter 24 and the potential at gate 19 of transistor Q19 also rise slowly as the rise of the power supply voltage as shown in FIGS. 13 (e) and (f), respectively.

When the potential at gate 19 of transistor Q19 reaches a threshold voltage of transistor Q19, transistor Q19 conducts to lower the potential at node 16 to the low potential of ground GND. Accordingly, while the potential at node 16 gradually rises after the turning-on of the power supply, it is pulled down to a low level before rising to a high level.

When the potential at node 16 is pulled down to the low level, transistor Q26 constituting inverter 22 becomes more fully conductive. In response thereto, the potential at node 17 rises to the then power supply voltage and thereafter, it rises at approximately the same rise rate as that of the power supply potential to duly attain a high level. The potential change of the node 17 appears at input end 18 of inverter 24 with the delay time τ1, whereby the potential at the input end 18 similarly changes to the potential at node 17. As a result, the potential at input end 18 reaches the threshold voltage of inverter 24, thereby pulling down the increasing output potential at inverter 24 to a low level. Consequently, the output potential of inverter 24 gradually rises after the turning-on of the power supply. However, the rising rate is so slow that the output potential is pulled down to a low level before rising to a high level. This output potential change of inverter 24 appears at gate 19 of transistor Q19 with the delay time τ2 in delay circuit 21. The potential at gate 19 of transistor Q 19 accordingly changes similarly to the output potential at inverter 24 does. Namely, while the potential at gate 19 rises to the threshold voltage of transistor Q19 after the turning-on of the power supply, it attains a low level shortly after that to render transistor Q19 nonconductive.

Since transistor Q25 is maintained in an on state in response to the high level potential latched in node 17 after transistor Q19 becomes non-conductive, the potentials at node 16, gate 19 and the output end of inverter 24 are maintained at a low level and the potentials at node 17 and input end 18 attain a high level in due course and it is fixed to the level.

As can be understood from the above, if the rise rate of the power supply voltage is slow, the output potential of inverter 24 is pulled down to a low level before rising to a high level after the turning-on of the power supply.

Therefore, the potential of the output (output $\phi_{POR}$ of this internal reset circuit) of inverter 24 takes the waveform as shown in FIG. 13 (e) not including the complete high level portion for a certain period after a turning-on of the power supply as shown in FIG. 11 (e).

Meanwhile, the internal circuit to be reset by the output signal of the internal reset circuit generating a high level one shot pulse is reset for a period when a high level signal is applied from the internal reset circuit as a result of a potential level at a predetermined node therein forced to a level to be obtained in an initial state. Thus, in order to fully reset the internal circuit, such one shot pulse should be generated as having a level and a width allowing the predetermined node to be fully forced to the level to be obtained in the initial state. Therefore, when the rise rate of the power supply potential after the turning-on of the power supply is slow, it sometimes occurs that a sufficient one shot pulse can not be obtained from the conventional internal reset circuit for resetting the internal circuit. Consequently, according to a conventional internal reset circuit, an internal circuit might not be fully reset depending on a rise rate of a power supply voltage to cause malfunction of the device.

SUMMARY OF THE INVENTION

Therefore, an object of the present invention is to provide a semiconductor integrated circuit device having an internal circuit reliably reset irrespective of a rise rate of a power supply potential at a turning-on of a power supply.

Another object of the present invention is to provide a semiconductor integrated circuit device comprising an internal reset circuit reliably generating one shot pulse of a predetermined potential level irrespective of a rise rate of a power supply potential at a turning-on of a power supply.

A further object of the present invention is to provide a semiconductor integrated circuit device in which no malfunction due to erroneous resetting of an internal circuit occurs even when no one shot pulse is generated from an internal reset circuit at a turning-on of a power supply.

In order to achieve the above-described objects, the semiconductor integrated circuit device according to the present invention includes an internal circuit operative in response to an internal clock signal and an initialization circuit for initializing the internal circuit based on a power supply potential and the internal clock signal. The initialization circuit includes a first node coupled to the power supply potential and which potential changes following a change in the power supply potential upon a turning-on of the power supply, a first circuit element coupled to the first node so as to contribute to the potential change of the first node, and a reset signal generating circuit for generating a reset signal for initializing the internal circuit in response to a predetermined potential at the first node after the turning-on of the power supply and the internal clock signal. The internal circuit includes a function circuit having a second node and functioning in response to the potential at the second node, an enforcing circuit for enforcing the potential at the second node to the potential required for initialization of the function circuit in response to the reset circuit generated by the reset signal generating circuit, and a second circuit element coupled to the second node so as to contribute to the potential change of the second node, which internal circuit being structured such that when the reset signal generating circuit generates no reset signal after the turning-on of the power supply, the potential at the second node attains the necessary potential for initializing the function circuit by varying the first circuit element and the second circuit element in contribution to the potential changes of the first node and the second node, respectively.

As the foregoing, the reset signal generating circuit in the semiconductor integrated circuit device according to the present invention is structured, differently from the conventional one, so as to generate the reset signal in response to the potential at the first node coupled to the power supply potential and which potential changes following the potential change of the power supply upon the turning-on of the power supply and the potential of the internal clock signal. Therefore, irrespective of the rise rate of the power supply potential after the turning-on of the power supply, when the potential at the first node attains the predetermined potential, the reset signal generating circuit generates a reset signal without fail. Since the degrees of contribution of the first circuit element and the second circuit element to the potential changes at the first node and the second node, respectively, is settled such that when the reset signal generating circuit generates no reset signal even after the turning-on of the power supply, the potential at the second node attains the necessary potential for resetting the function circuit, even if the reset signal generating circuit generates no reset signal when the potential at the first node is not the predetermined one, the potential at the second node is at the predetermined potential to be settled after the turning-on of the power supply, thereby causing no malfunction of the device.

According to a preferred embodiment, the reset signal generating circuit includes a one shot pulse generating circuit for outputting a single pulse synchronizing with the first level inversion of the internal clock signal after the turning-on of the power supply in response to the predetermined potential at the first node and the internal clock signal.

The first circuit element includes a first MOS transistor coupling the first node to the power supply potential and a second MOS transistor coupling the first node to the ground potential, the second circuit element includes a third MOS transistor coupling the second node to the power supply potential, and a fourth MOS transistor coupling the second node to the ground potential, the MOS transistors different from the first and the second MOS transistors in characteristics such as a threshold voltage and a channel length and the like.

In a case where the predetermined potential is a power supply potential which has completely risen, i.e., "H" level, and the necessary potential for resetting the function circuit is a ground potential (="L" level), the first circuit element includes a first capacitor coupling the first node to the power supply potential and the second circuit element includes a second capacitor coupling the second node to the ground potential.

The enforcing circuit includes a MOS transistor provided between the second node and ground and having a gate receiving the output of the reset signal generating circuit.

It is desirable that the circuit arrangement is the same with respect to the first node and the second node.

According to a more preferred embodiment, the one shot pulse generating circuit includes a first inverter provided between the power supply and ground for inverting the potential at the first node, a holding circuit for holding the potential at the first node in response to the output of the first inverter, a two-input NOR gate inputting the output of the first inverter and the internal clock signal, and a second inverter for inverting the potential level of the first node in response to the inversion of the output potential level of the first inverter. The potential of the internal clock signal is inverted from the "H" level to the "L" level after the turning-on of the power supply.

The function circuit includes, for example, an inverter receiving the potential at the second node and a MOS transistor having a gate receiving the output of the inverter and provided between ground and the second node. In such a case, the holding circuit desirably includes a MOS transistor provided between the first node and ground and having a gate receiving the output of the first inverter.

The function circuit includes, for example, an inverter for inverting the potential at the second node and an inverter for inverting the output of this inverter and applying the inverted output to the second node. In such a case, the holding circuit desirably includes an inverter for inverting the output of the first inverter and applying the inverted output to the first node.

In accordance with another aspect, the semiconductor integrated circuit device according to the present invention is a semiconductor integrated circuit device for initializing the circuit operative in response to a clock signal, the device including a node, a raising circuit for raising the potential at the node to the power supply potential upon the turning-on of the power supply, an inverting circuit for inverting the potential at the node raised by the raising circuit, a logical gate, for example an NOR gate, receiving the inversion output of the inversion circuit and the clock signal, a delay circuit for delaying the output of the logical gate by a certain time, and a lowering circuit for lowering the potential at the node to the ground potential, the output of the logical gate being applied to the circuit operative in response to the clock signal as a reset signal for initializing the circuit.

According to the semiconductor integrated circuit device of the present invention, an internal node can be reset irrespective of a rise time of the power supply by reliably generating a reset signal in synchronization with an internal clock as required prior to a start of an operation of the device. Therefore, the internal circuit is more reliably reset than in the conventional one to avoid malfunction of the device caused by erroneous resetting, thereby improving the reliability of the semiconductor integrated circuit device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4 and 5 are timing charts explaining an operation of the internal reset circuit shown in FIGS. 2 and 3.

FIGS. 10 and 12 are circuit diagrams showing the arrangements of the conventional internal reset circuits.

FIGS. 11 and 13 are timing charts explaining an operation of the conventional internal reset circuit.

DESCRIPTION OF THE PREFERRED EMBODIMENTS

Figure 1:
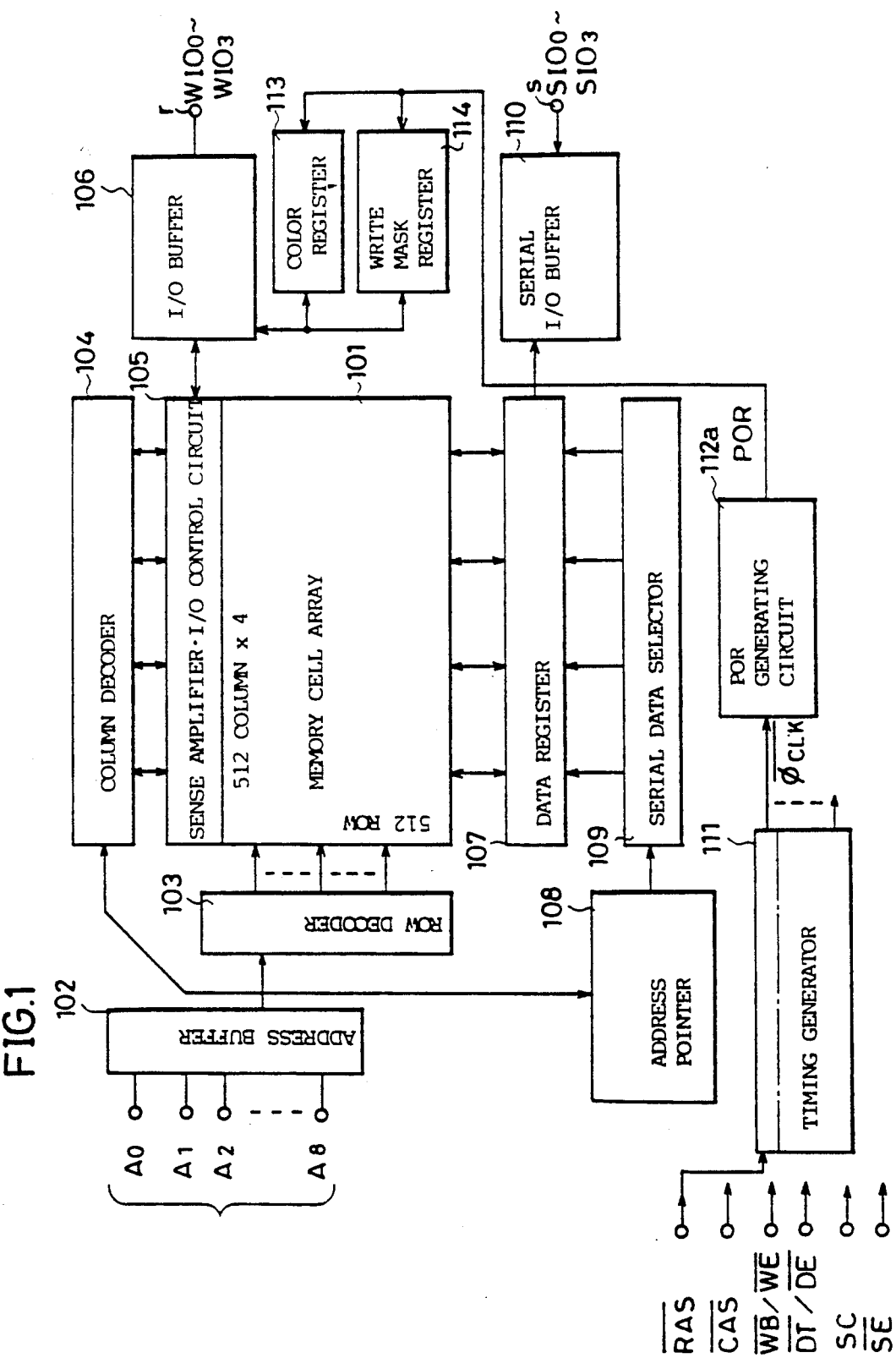
FIG. 1 is a schematic block diagram of a dual port memory according to one embodiment of the present invention.
Figure 9:
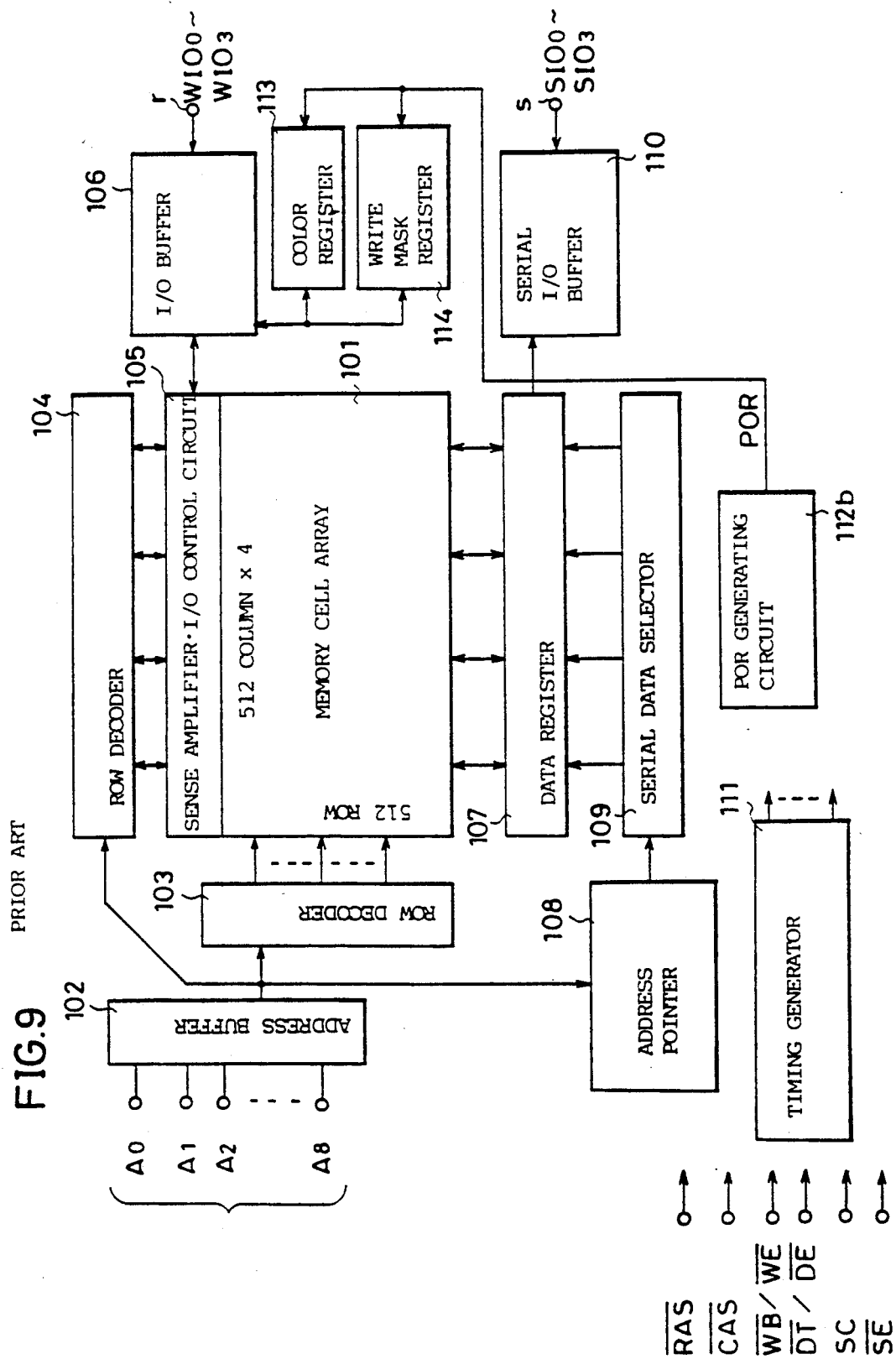
FIG. 9 is a schematic block diagram of a dual port memory comprising a conventional internal reset circuit.
Figure 12:
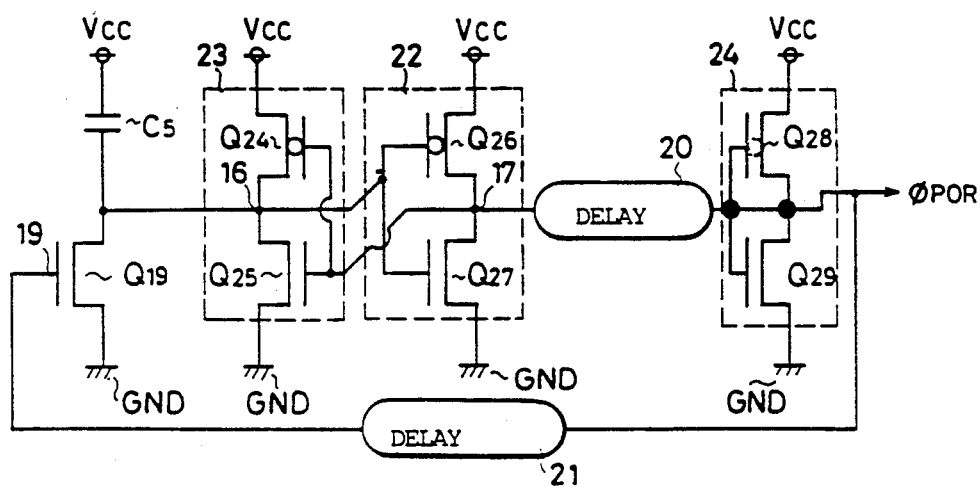
Figure 13:
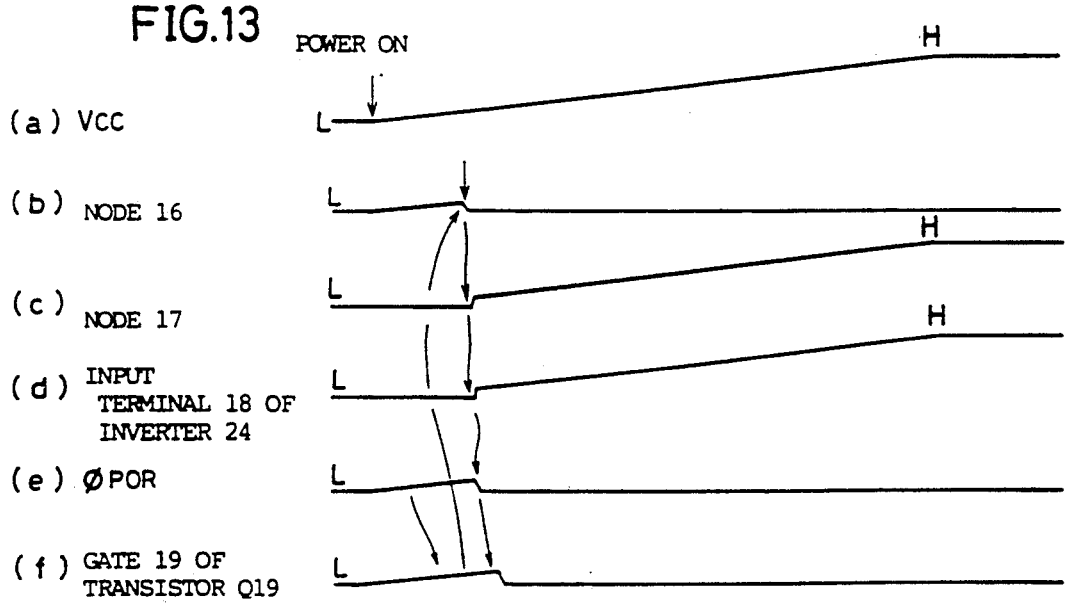

FIG. 1 is the schematic block diagram of the dual port memory according to one embodiment of the present invention. Referring to FIG. 1, the dual port memory has the same arrangement as that of the conventional dual port memory shown in FIG. 9. Different from the conventional POR generating circuit 112b of FIG. 9, a POR generating circuit 112a provided in this dual port memory receives a clock signal $\overline{\phi_{CLK}}$ generated by timing generator 111 based on, for example, an external address strobe signal $\overline{RAS}$, to generate a reset pulse POR and outputs the same. The arrangements and operations of the other function blocks of this dual port memory are as described in "Description of the Background Art".

Figure 2:
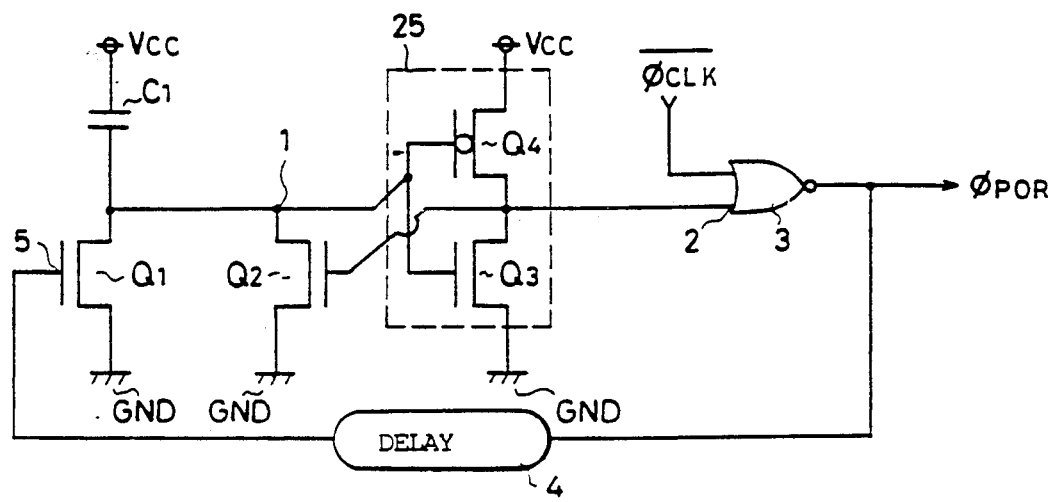
FIGS. 2 and 3 are circuit diagrams showing one example of the internal reset circuit for use in the dual port memory of FIG. 1.

FIG. 2 is the circuit diagram showing one example of the arrangement of the internal reset circuit for use as POR generating circuit 112a shown in FIG. 1.

Referring to FIG. 2, the internal reset circuit includes an inverter 25 comprising series-connected capacitor C1 and N channel MOS transistor Q1 and series-connected N channel MOS transistor Q3 and P channel MOS transistor Q4 both series-connection between power supply Vcc and ground GND. The connection point between capacitor C1 and transistor Q1 is connected to the input end of inverter 25, that is, the gates of transistor Q3 and Q4.

This internal reset circuit further comprises an N channel MOS transistor Q2 provided between the input end of inverter 25 and ground GND, a two-input NOR gate 3 receiving the potential at the output end of inverter 25, that is, at the connection point between transistors Q3 and Q4, and the internal clock signal $\overline{\phi_{CLK}}$, and a delay circuit 4 provided between the output end of NOR gate 3 and a gate 5 of transistor Q1. The output $\phi_{POR}$ of the internal reset circuit is extracted from the output end of NOR gate 3.

Described with reference to FIG. 5 is an operation of the above-described internal reset circuit when the power supply voltage rapidly rises upon a turning-on of the power supply. FIG. 5 is the timing chart explaining the basic operation of the internal reset circuit of the above-described arrangement. When the power supply is turned on, the potential at power supply Vcc rises to a predetermined potential (high level) as shown in FIG. 5 (a). As the potential of the power supply Vcc rises, the potential at the connection point between capacitor C1 and transistor Q1, that is, at the input end (node 1) of inverter 25 also rises at approximately the same rate as that of the power supply potential (see FIG. 5 (b)).

Meanwhile, with transistor Q4 being on in inverter 25 immediately after the turning-on of the power supply, the potential at the output end of inverter 25, that is, at one input end 2 of NOR gate 3 starts rising in response to the potential at the power supply Vcc. However, since the potential at node 1 rises immediately to attain a high potential allowing transistor Q3 to be turned on and transistor Q4 to be turned off, the potential at one input end 2 of NOR gate 3, which is supposed to rise immediately after the turning-on of the power supply, is rapidly pulled down to the potential (low level) of ground GND (see FIG. 5 (c)).

Meanwhile, as shown in FIG. 5 (d), the internal clock signal $\overline{\phi_{CLK}}$ repeats level inversion at a predetermined timing after rising to a high level upon the turning-on of the power supply. While potentials at both input ends of NOR gate 3, that is, the potential of the internal clock signal $\overline{\phi_{CLK}}$ and the potential at the output end of the inverter 25 are at a low level immediately after the turning-on of the power supply, one of the potentials (the potential of the internal clock signal $\overline{\phi_{CLX}}$) instantly attains a high level. As a result, the output potential of NOR gate 3, that is, the potential of the output signal $\phi_{POR}$ of this internal reset circuit, which potential is supposed to rise immediately after the turning-on of the power supply when both input potentials to NOR gate 3 are at a low level as shown in FIG. 5 (e), is pulled down to a low level before rising to a high level because one input potential instantly attains a high level. Thereafter, the fall of the internal clock signal $\overline{\phi_{CLK}}$ causes the two input potentials to NOR gate 3 to remain at a low level until the next rise of the internal clock signal $\overline{\phi_{CLK}}$. As a result, the output potential of NOR gate 3 rises to a high level.

Meanwhile, the output potential of NOR gate 3 is fed back with a delay time in delay circuit 4 to gate 5 of transistor Q1. As shown in FIG. 5 (f), the potential at gate 5 accordingly rises to a high level later than the fall of the output potential at NOR gate 3 by the predetermined time. In response to the rise of the potential at gate 5 to a high level, transistor Q1 is turned on, whereby the potential at node 1 falls from the high level to a low level (see FIG. 5 (b)). Consequently, transistor Q3 is replaced by transistor Q4 to be turned on in inverter 25, so that the potential at input end 2 of NOR gate 3 rises from the low level to a high level (see FIG. 5 (c)). Namely, one input potential to NOR gate 3 rises to a high level later than the first fall of the internal clock signal $\overline{\phi_{CLK}}$ later by a time period corresponding to the delay time in delay circuit 4, whereby the potential at the output end of NOR gate 3 falls to a low level. Namely, the internal reset circuit outputs one shot pulse of a high level.

The potential at input end 2 of NOR gate 3 being applied to the gate of transistor Q2 attains a high level, so that transistor Q2 is turned on to fix the potential at node 1 to the potential at ground GND, that is, to a low level. Therefore, even after transistor Q1 is turned off as a result of the fall of the output potential at NOR gate 3 to a low level, the potential at node 1 is rendered to be a low level by transistor Q2. As a result, the potential at input end 2 of NOR gate 3 is maintained at a high level after falling upon the turning-on of the power supply. Therefore, after attaining a high level for a certain period after the turning-on of the power supply, the output potential at NOR gate 3 is maintained at a low level irrespective of the potential of the internal clock signal $\overline{\phi_{CLK}}$. Namely, this internal reset circuit generates one shot pulse of a high level just once after the turning-on of the power supply.

Figure 3:
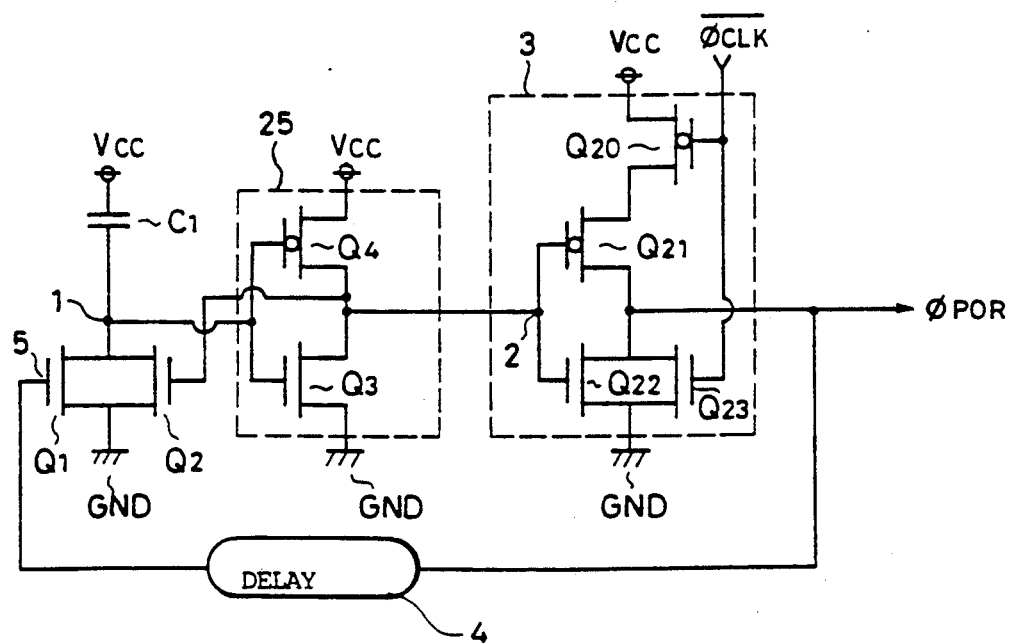

As the foregoing, the internal reset circuit is structured to generate a one shot pulse in synchronization with the first rise of the internal clock signal. Now, described with reference to FIGS. 3 and 4 will be an operation of this internal reset circuit when a rise rate of the power supply potential is slow after a turning-on of the power supply. FIG. 3 is the circuit diagram of the above-described internal reset circuit wherein the circuit arrangement of NOR gate 3 is illustrated in detail and FIG. 4 is the timing chart explaining an operation of the above-described internal reset circuit when the rise rate of the power supply potential is slow after a turning-on of the power supply.

Referring to FIG. 3, NOR gate 3 of FIG. 2 comprises series-connected P channel MOS transistors Q20 and Q21 and N channel MOS transistor Q22 provided between the power supply Vcc and ground GND, and a transistor Q23 connected in parallel to transistor Q22. The internal clock signal $\overline{\phi_{CLK}}$ is applied to the gates of transistors Q20 and Q23.

Meanwhile, since the potential of the internal clock signal $\overline{\phi_{CLK}}$ rises as the rise of the power supply potential, when the potential at the power supply Vcc gradually rises as shown in FIG. 4 (a) after the turning-on of the power supply, the potential of the internal clock signal $\overline{\phi_{CLK}}$ gradually rises after the turning-on of the power supply (see FIG. 4 (d)). As a result, the potential at node 2 which is the output end of inverter 25 attains a low level after the power on. Transistor Q21 is accordingly in the on state in NOR gate 3 after the power on. In NOR gate 3, transistor Q23 is not turned on immediately after the power on but transistor Q20 is turned on during a certain period after the power on. Namely, with both transistors Q20 and Q21 being on in NOR gate 3 after the power on, the output potential of NOR gate 3, that is, the potential at the node between transistors Q21 and Q23 gradually rises in response to the power supply potential as shown in FIG. 4 (e). However, when the potential of the internal clock signal $\overline{\phi_{CLK}}$ reaches a threshold voltage of transistor Q23, transistor Q23 is turned on to pull down the output potential of NOR gate 3 to the potential of ground GND, which output potential attains a low level after the power on. As a result, transistor Q1 having gate 5 receiving the output potential of NOR gate 3 through delay circuit 4 and transistor Q2 having the gate receiving the potential at node 2 are off after the power on. Therefore, the potential at node 1 after the power on is determined by the power supply potential.

Thereafter, when the internal clock signal $\overline{\phi_{CLK}}$ falls at a predetermined timing after the complete rise of the power supply potential to a predetermined potential and the complete rise of the internal clock signal $\overline{\phi_{CLK}}$, transistor Q20 in place of transistor Q23 conducts in NOR gate 3. Meanwhile, the potential at node 2 is at a low level and transistor Q21 is conductive. In response to the fall of the internal clock signal $\overline{\phi_{CLK}}$, the output potential at NOR gate 3 attains a high level in response to the power supply potential which has completely risen (see FIG. 4 (e)).

The operation of this internal reset circuit thereafter is the same as that in the case where the power supply potential rises quickly. Namely, transistor Q1 having the gate 5 receiving the output potential of NOR gate 3 through delay circuit 4 conducts, whereby the output potential of inverter 25 attains a high level to render transistor Q2 conductive. As a result, the potential at node 2 is fixed to a high level and the output potential at NOR gate 3, after attaining a low level in response to the conduction of transistor Q22, is maintained at a low level irrespective of the later level change of the internal clock signal $\overline{\phi_{CLK}}$. Namely, the internal reset circuit outputs one shot pulse just once after the power on.

As the foregoing, even if the rise rate of the power supply potential after a power on is slow, the internal reset circuit outputs one shot pulse enough to reset predetermined internal circuits in FIG. 1, for example, color register 113 and write mask register 114 or the like. In this internal reset circuit, the internal clock signal $\overline{\phi_{CLK}}$ dropping to a low level at a predetermined timing after completely rising in response to the power supply potential, is applied to the gate of one transistor Q20 out of P channel transistors Q20 and Q21 to raise the output potential at NOR gate 3 to a high level, while the other transistor Q21 is rendered conductive after the power on. Therefore, both transistors Q20 and Q21 are on only for a period starting immediately after the power on and ending when the potential of the internal clock signal $\overline{\phi_{CLK}}$ exceeds the threshold voltage of transistor Q20 for a period starting from the first fall of the potential of the internal clock signal and ending when the output potential of inverter 25 exceeds the threshold voltage of transistor Q21. In the case where the rise rate of the power supply potential after the power on is slow, the power supply potential does not completely rise in the former period, preventing the output potential at NOR gate 3 from rising to a high level. However, if the power supply potential rises sufficiently to a high level in the latter period, the output potential at NOR gate 3 rapidly rises to a high level. As a result, even if the rise rate of the power supply potential is slow, sufficient one shot pulses can be obtained.

Figure 6:
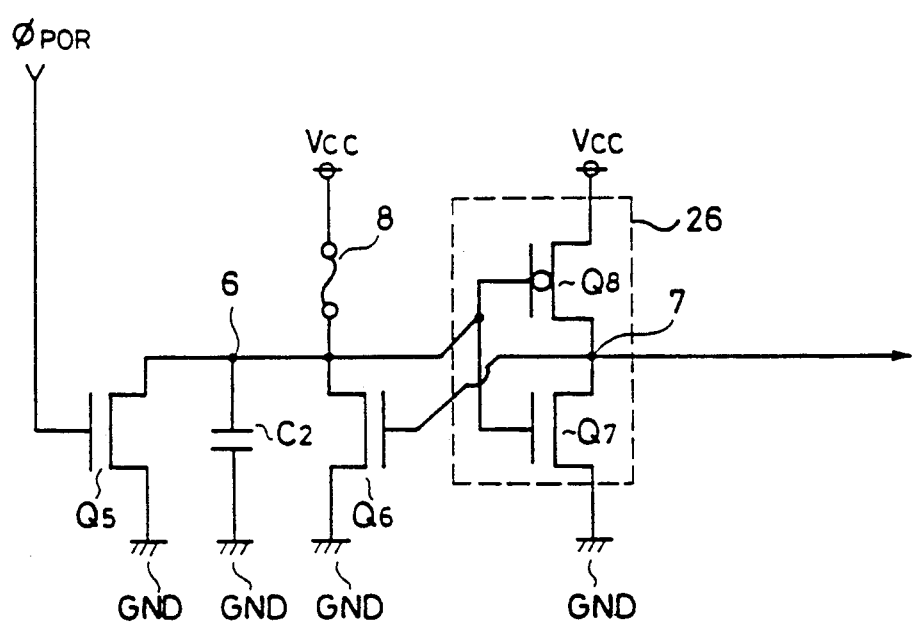
FIG. 6 is a circuit diagram of a logic setting circuit desirably reset by the internal reset circuit shown in FIGS. 2 and 3.

While the internal reset circuit of such arrangement as shown in FIG. 2 can be used as the POR generating circuit 112a of the dual port memory shown in FIG. 1, it is desirably used for resetting the logic setting circuit of such arrangement as shown in FIG. 6. FIG. 6 is the circuit diagram showing one example of the logic setting circuit desirably reset by the internal reset circuit shown in FIGS. 2 and 3.

Referring to FIG. 6, the logic setting circuit includes an inverter 26 comprising series-connected N channel MOS transistor Q7 and P channel MOS transistor Q8 provided between the power supply Vcc and ground GND, and N channel transistors Q5, Q6 and a capacitor C2 provided in parallel between the input end of the inverter 26 and ground GND. A fuse 8 is provided between transistor Q6 and the power supply Vcc, the gate of transistor Q6 is connected to the output end of inverter 26, that is, to the connection point (a node 7) between transistors Q7 and Q8, (a node 7) and the gate of transistor Q5 receives an output signal $\phi_{POR}$ of the internal reset circuit. The output of this logic setting circuit is extracted from the node 7.

Logic setting circuits using such fuses are often used in RAMs, EPROMs or the like for setting memory cell arrays to be used in practice. In many cases, RAMs, EPROMs or the like include spare memory cell arrays in addition to the memory cell arrays to be ordinarily used. Such a spare memory cell array is a redundancy circuit for use in preventing the decrease in yields of LSIs or the like, which circuit replaces the defective memory cell array if a part of the memory cell arrays to be ordinarily used has any defect. Therefore, at a start of operations of such RAM, EPROM or the like (at a power on), signals instructing use/non-use should be applied to the respective memory cell arrays such that defective memory cell arrays are disabled and spare memory cell arrays replacing the same are enabled.

Thus, such a semiconductor memory device as described above includes a logic setting circuit provided for each memory cell array for applying the instructing signal. Such a logic setting circuit generally includes a fuse as shown in FIG. 6. The logic setting circuit is structured to apply a signal instructing either the use or non-use after a power on based on whether the fuse is cut off or not. When it is verified that a part of a memory cell array to be originally used is defective through a function test after the manufacture of such a semiconductor memory device as described above, the fuse of the logic setting circuit is selectively cut off in accordance with the setting of use/non-use of each memory cell array.

For example, in the logic setting circuit shown in FIG. 6, if fuse 8 is disconnected, the potential at node 6 does not rise and remains at a low level even if the power is on. The potential at node 7, that is, at the output of inverter 26, accordingly attains a high level in response to the conduction of transistor Q8. Meanwhile, with the potential at node 7 being also applied to the gate of transistor Q6, the potential at node 6 after the power on is fixed to the potential (low level) at ground GND in response to the conduction of transistor Q6. As a result, after the power on, the potential at node 7 is maintained at a high level for instructing use or non-use.

Therefore, the potential at node 6 needs to be at a low level without fail at the power on so that the potential at node 7 reliably attains a high level after the power on when fuse 8 is disconnected. However, since no ground potential is applied to node 6 unless transistor Q6 conducts, the potential at node 6 does not necessarily attain a potential low enough to render transistor Q8 conductive at the power on. Then, transistor Q5 is provided which conducts in response to a high level one shot pulse outputted by the above-described internal reset circuit in order to render the potential at node 6 the ground potential immediately after the power on, that is, to reset. Namely, when a high level one shot pulse is applied from the internal reset circuit after the power on, transistor Q5 conducts only for the period when transistor Q5 receives the one shot pulse, thereby rendering the potential at node 6 the potential at ground GND. Therefore, even if the potential at node 6 rises to a level for some causes which level should not be obtained at the power on, the potential is immediately returned to a level (referred to as an original level) which should be obtained at the power on. As a result, the correct instructing signal can be obtained from node 7, allowing a correct setting of use/non-use of a memory cell array.

Comparing node 6 to be reset with node 1 determining a rise timing of the output potential of the internal circuit shown in FIG. 2, while node 6 is connected to ground GND through N channel MOS transistors Q5 and Q6, and capacitor C2, node 1 is connected to ground GND through N channel MOS transistors Q1 and Q2 and to the power supply Vcc through capacitor C1. Therefore, if such characteristics as a threshold voltage and a channel length are the same for transistors Q5 and Q6, and transistors Q1 and Q2, the potential at node 1 is liable to be pulled up to the power supply potential Vcc and that at node 6 is liable to be pulled down to the ground potential GND. Namely, node 1 more easily attains a high potential than the node 6. Thus, if the potential at node 1 of the internal reset circuit is at a low level after the power on, the potential at node 6 of the logic setting circuit is also at a low level. If the potential at node 6 is low herein, it is not necessary for the logic setting circuit to be reset.

The potential at node 2 needs to attain a high level when the internal clock signal $\overline{\phi_{CLK}}$ falls so that the output of NOR gate 3 reliably rises after the power on. This requires the potential at node 1 to be at a high level in order to turn on transistor Q3 at a fall of the internal clock signal $\overline{\phi_{CLK}}$. Therefore, if the potential at node 1 remains at a low level at the fall of the internal clock signal $\overline{\phi_{CLK}}$, transistor Q3 is not fully turned on, which prevents NOR gate 3 from outputting sufficient reset pulses in some instances. However, in such embodiment as described above, when node 1 is at a low level, node 6 to be reset is at a low level at any time. In such a case, even if a sufficient reset pulse is not outputted, no malfunction occurs in the function part coupled to the circuit to be reset.

Conversely, if the potential at node 6 is at a high level after the power on, the potential at node 1 is also at a high level. Accordingly, when the potential at node 6 attains a high level upon the power on (when node 6 attains a potential to be reset), the internal reset circuit outputs sufficient one shot pulses of a high level irrespective of the rise rate of the power supply potential, as described above.

As the foregoing, with node 1 set to easily attain a high potential than the node 6 does, the internal reset circuit reliably outputs one shot pulses when the node 6 to be reset requires resetting at a fall of an internal clock signal.

A semiconductor integrated circuit device requiring an internal clock signal is generally structured to start its operation in response to the first fall of the internal clock signal after a power on. Thus, the internal reset circuit shown in FIG. 2 is capable of rendering the potential at node 6 to be reset at the original level irrespective of a potential attained by node 1 after the start of the operation of the device.

A balance of a liability of node 6 to be reset to attain a high potential and that of internal node 1 of the internal reset circuit determining a rise timing of the output potential of the internal reset circuit to attain a high potential can be controlled by controlling coupling capacitances between the respective nodes and a higher potential source and a lower potential source, characteristics of a transistor connected for supplying the respective nodes with the output potential of the lower potential source (or the output potential of the higher potential source) or the like. The characteristics of these nodes are affected by the characteristics of all the circuit elements connected to the respective nodes. Thus, from the view point of facility in the above-described controlling, arrangements of the internal reset circuit and a circuit to be reset by the same are desirably similar to each other with respect to the respective nodes. For example, assuming that the capacitors C1 and C2 and the fuse 8 are removed in the above-described embodiment, the arrangement of the internal reset circuit with respect to node 1 and the arrangement of the logic setting circuit with respect to node 6 are the same.

Therefore, the circuit arrangements with respect to the node determining a generation timing of one shot pulses in the internal reset circuit for use as POR generating circuit 112a shown in FIG. 1 are desirably similar to that with respect to the node to be reset in a color register 113 and a write mask register 114.

Figure 7:
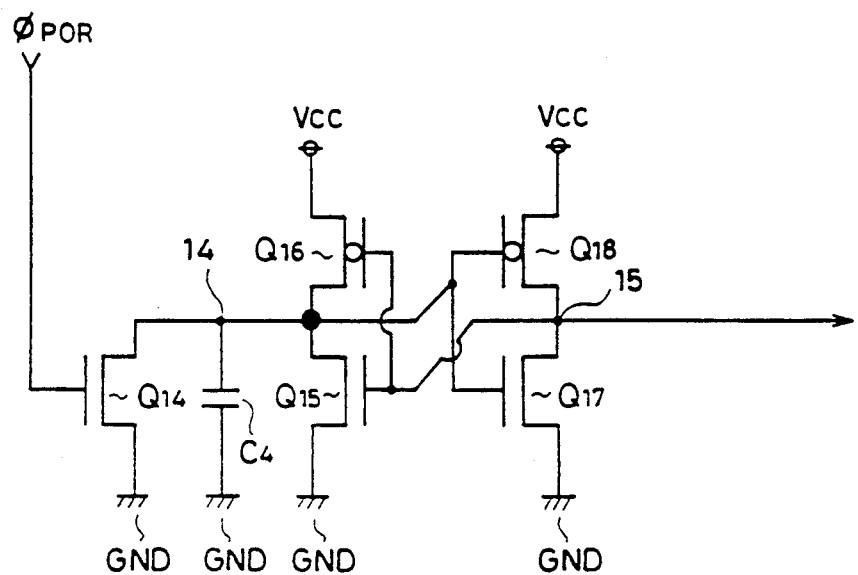
FIG. 7 is a circuit diagram showing one example of a latch circuit to be reset by an internal reset circuit.

FIG. 7 is the circuit diagram showing one example of a latch circuit to be reset immediately after a power on and shows a circuit arrangement with respect to the node to be reset in each of color register 113 and write mask register 114 of FIG. 1. Referring to FIG. 7, the latch circuit includes N channel MOS transistors Q14, Q15 and Q17, P channel MOS transistors Q16 and Q18 and a capacitor C4, showing the arrangement of the logic setting circuit shown in FIG. 6 with fuse 8 replaced by P channel MOS transistor Q16. Namely, the gate of transistor Q16 is connected to the gate of transistor Q15 for receiving a potential at a connection point between transistors Q17 and Q18, which point is the output end of the latch circuit. In the latch circuit, no transmission path is formed for the potential at the power supply Vcc to node 14 (corresponding to node 6 in the logic setting circuit shown in FIG. 6) unless transistor Q16 conducts. Thus, while the output of the latch circuit is supposed to attain a high level, the potential at node 14 needs to be reset to a low level after a power on because the potential at node 14 might rise for some reasons. Similarly to a case where logic setting circuit of FIG. 6 is reset, transistor Q14 conducts in response to a high level one shot pulse from the internal reset circuit after a power on, thereby forcing the potential at node 14 to ground potential.

Figure 8:
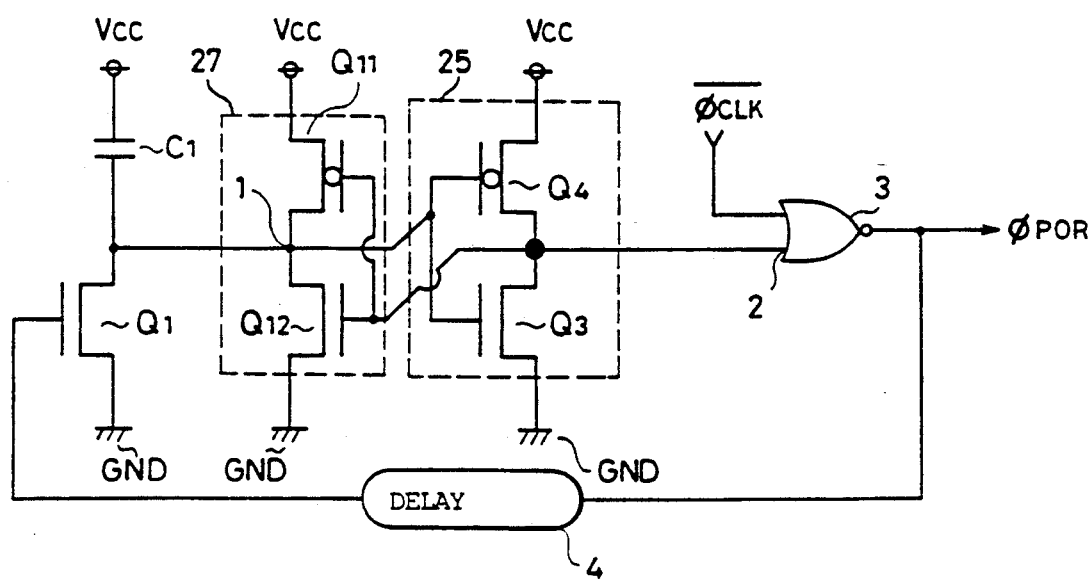
FIG. 8 is a circuit diagram showing one example of an internal reset circuit desirably resetting the latch circuit shown in FIG. 7 according to another embodiment of the present invention.

FIG. 8 is the circuit diagram showing one example of an arrangement of a preferred internal reset circuit for resetting the above-described latch circuit, which is another embodiment of the present invention. Referring to FIG. 8, the internal reset circuit is provided with a P channel MOS transistor Q11 between node 1 and power supply Vcc, different from that shown in FIG. 2. The gate of transistor Q11 is connected with the gate of transistor Q2. Namely, transistors Q2 and Q11 constitute an inverter 27. The reason for this provision is for facilitating control of a difference between the liability of node 1 to attain a high potential and the liability of node 14 to be reset to attain a high potential by making the circuit arrangement with respect to node 14 in the latch circuit to be reset the same as the circuit arrangement with respect to node 1 in the internal reset circuit In this internal reset circuit, when the potential at one input end 2 of inverter 3 attains a low level, transistor Q11 is turned on and transistor Q2 is turned off, so that the power supply potential is transmitted to node 1 through capacitor C1 and transistor Q11. Namely, transistor Q11 serves to reliably supply a high potential to node 1. Thus, the basic operations of the internal reset circuit are the same as those of the internal reset circuit shown in FIG. 2, by which one shot pulses can be reliably generated even at a slow rise rate of the power supply potential.

Furthermore, in the internal reset circuit, while capacitor C1 is provided between node 1 and the power supply Vcc, capacitor C4 is provided between the node to be reset and ground GND in the circuit to be reset, whereby node 1 is more liable to attain a high level than node 14 as long as other circuit elements connected to node 1 and other circuit elements connected to node 14 have the same characteristics. When the potential at node 1 is not at a high level at a fall of the internal clock signal $\overline{\phi_{CLK}}$, node 14 to be reset attains a high level without fail. Therefore no malfunction occurs in the circuit part operative in response to the potential at node 15 even if transistor Q14 does not receive sufficient one shot pulses.

Each of color register 113 and write mask register 114 to be reset in the dual port memory of FIG. 1 is a circuit having latching functions for temporality storing data, which circuit has such arrangement as shown in FIG. 7. Thus, the internal reset circuit having the arrangement shown in FIG. 8 is desirably used as POR generating circuit 112a in the dual port memory shown in FIG. 1.

While in the above-described embodiment, a potential at a node to be reset should be low level at the power on, the internal reset circuit according to the present invention can be applied to a case where the potential should be high level at the power on. While any of the internal reset circuits described in the above-described embodiment is structured so as to output one shot pulses at a high level, it can be structured to output one shot pulses of a low level by adding another inverter to the output stage of the internal reset circuit if the circuit to be reset is structured so as to be reset in response to an external signal of a low level.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor integrated circuit device comprising internal clock signal generating means for generating an internal clock signal, internal circuit means operating in response to said internal clock signal and means for initializing said internal circuit means in response to a power supply potential applied from an external power supply and said internal clock signal, said initializing means including:

a first node coupled to said power supply potential and being subjected to potential changes following the change in said power supply potential upon application of the external power supply, first circuit element means coupled to said first node for changing the potential at said first node reset signal generating means for generating a reset signal initializing said internal circuit means in response to a predetermined potential at said first node after application of the power supply potential from the external power supply, and to the internal clock signal, and means for delaying the reset signal for a predetermined time, wherein said first circuit element means is responsive to said delayed reset signal for changing the potential at said first node to ground potential, and said reset signal generating means includes a one-shot pulse generating means for generating a single pulse reset signal.

2. The semiconductor integrated circuit device according to claim 1, wherein said internal circuit means comprises:

function element means coupled to a second node and responsive to a potential at said second node which changes, means coupled to said second node and responsive to said reset signal for supplying a potential to said second node for initializing said internal circuit means, and second circuit element means coupled to said second node for holding the potential at said second node, wherein an amount of potential change at said first node changed by said first circuit element means and an amount of potential change of said second node are different from each other and said second node attains a potential required for initializing said internal circuit means when said reset signal generating means generates no reset signal after application of the power supply potential from the external power supply.

3. The semiconductor integrated circuit device according to claim 1, wherein said one-shot pulse generating means is responsive to said internal clock signal for providing said single pulse reset signal synchronizing with a first level inversion of said internal clock signal after application of the external power supply.

4. The semiconductor integrated circuit device according to claim 2, further including a first coupling capacitance means coupled between said first node and said power supply potential, wherein said second circuit element means includes a second coupling capacitance means coupled between said second node and ground, said predetermined potential comprises said power supply potential, and said potential required for initializing said function element means comprises said ground potential.

5. The semiconductor integrated circuit device according to claim 2, wherein said reset signal generating means includes a first field effect semiconductor element coupling said first node to said power supply potential and a second field effect semiconductor element coupling said first node to the ground potential, and said function element means includes a third field effect semiconductor element coupling said second node to said power supply potential and a fourth field effect semiconductor element coupling said second node to the ground potential, wherein
threshold voltage and channel length of said first and second field effect semiconductor elements are different from those of said third and fourth field effect semiconductor elements.

6. The semiconductor integrated circuit device according to claim 3, wherein
said function element means includes first inverting means for inverting the potential of said second node and second inverting means for inverting an output potential of said first inverting means,
an output of said second inverting means is applied to said second node.

7. The semiconductor integrated circuit device according to claim 2, wherein
said function element means includes means for inverting the potential of said second node, fuse means for coupling said second node to said power supply potential and a field effect semiconductor element for coupling said second node to the ground potential,
said field effect semiconductor element has a control terminal receiving the output of said inverting means.

8. The semiconductor integrated circuit device according to claim 2, wherein said means for supplying a potential includes a field effect semiconductor element comprising a first conduction terminal connected to said second node, a second conduction terminal receiving said ground potential and a control terminal receiving an output of said reset signal generating means.

9. The semiconductor integrated circuit device according to claim 3, wherein said one shot pulse generating means includes:
first inverting means for inverting the potential at said first node,
means for maintaining the potential at said first node in response to an output of said first inverting means, and
logic gate means receiving as inputs the output of said first inverting means and said internal clock signal, and providing an output in response thereto, wherein
said first circuit element means is responsive to the delayed reset signal to invert the potential at said first node in response to a potential level of said output of said logic gate means.

10. The semiconductor integrated circuit device according to claim 6, wherein said reset signal generating means comprises:
third inverting means for inverting the potential at said first node, fourth inverting means for inverting the output of said first inverting means and applying the output to said first node, and
logic gate means receiving as inputs the outputs of said third inverting means and said internal clock means, and providing an output in response thereto, wherein
said first circuit element means is responsive to the delayed reset signal to invert the potential at said first node in response to a potential level of said output of said logic gate means.

11. The semiconductor integrated circuit device according to claim 7, wherein said reset signal generating means comprises:
third inverting means for inverting the potential at said first node,
a field effect semiconductor element for coupling said first node to said ground potential, said field effect semiconductor element having a control terminal receiving the output of said third inverting means, and
logic gate means receiving as inputs the outputs of said third inverting means and said internal clock signal, and outputting potential levels in response thereto, wherein
said first circuit element means is responsive to the delayed reset signal to invert the potential at said first node
in response to a potential level of said output of said logic gate means.

12. The semiconductor integrated circuit device according to claim 9, wherein said logic gate means includes a two-input NOR gate.

13. A semiconductor integrated circuit device for initializing a circuit operating in response to a clock signal, comprising:
a node,
raising means responsive to application of an external power supply for raising the potential of said node to a power supply potential,
means for inverting the potential of said node raised by said raising means and for holding the inverted potential,
logic gate means receiving as inputs the output of said inverting and holding means (25, and said clock signal,
the output of said logic gate means being applied to said circuit as a reset signal for initializing said circuit,
means for delaying by a predetermined time the output of said logic gate means, and
means responsive to the delayed output of said means for delaying for lowering the potential at said node to a ground potential.

14. The semiconductor integrated circuit device according to claim 13, wherein said logic gate means includes a two-input NOR gate.

* * * * *